ically opposite positions) 12 12, each# UNITED STATES PATENT OFFICE.

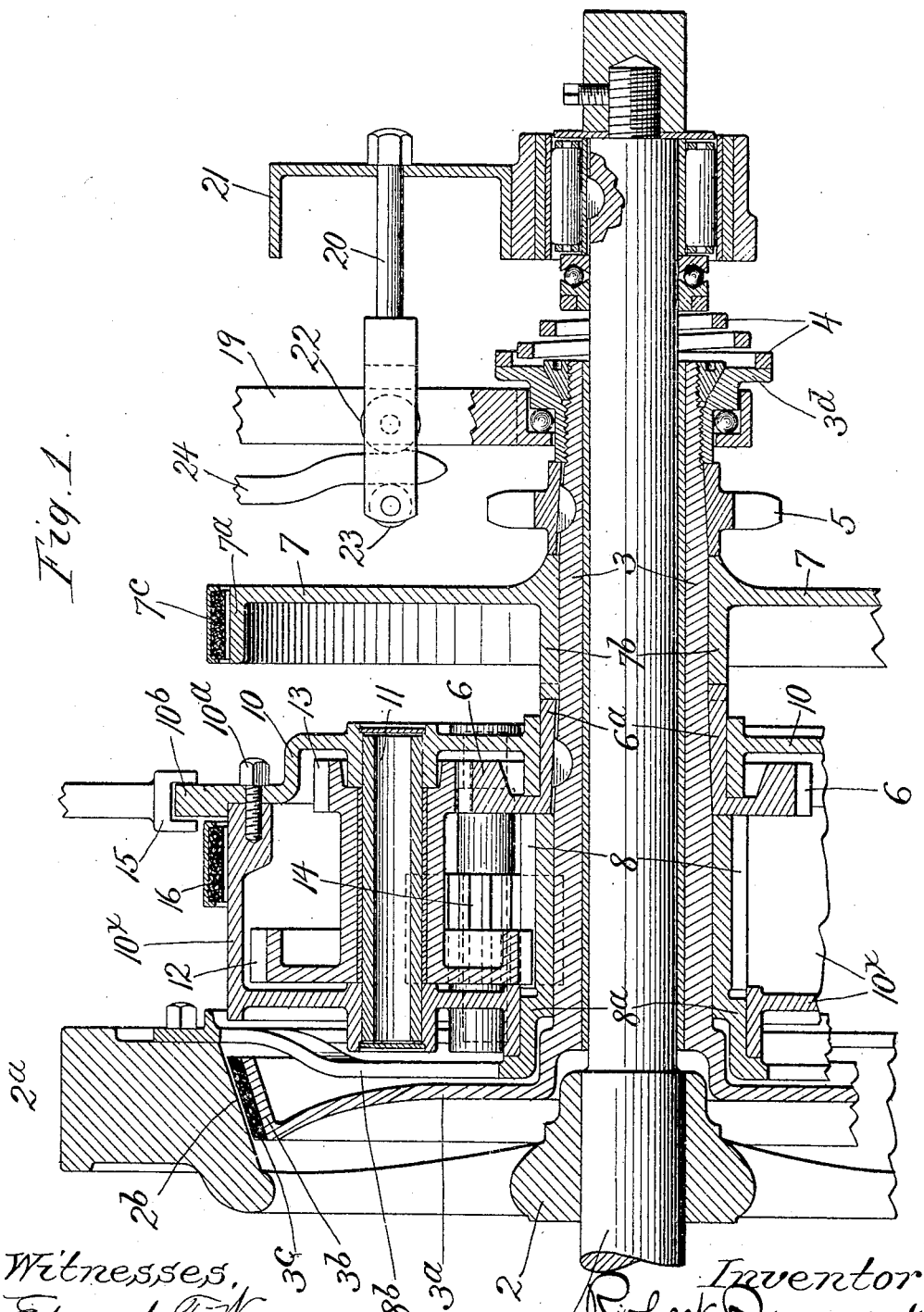

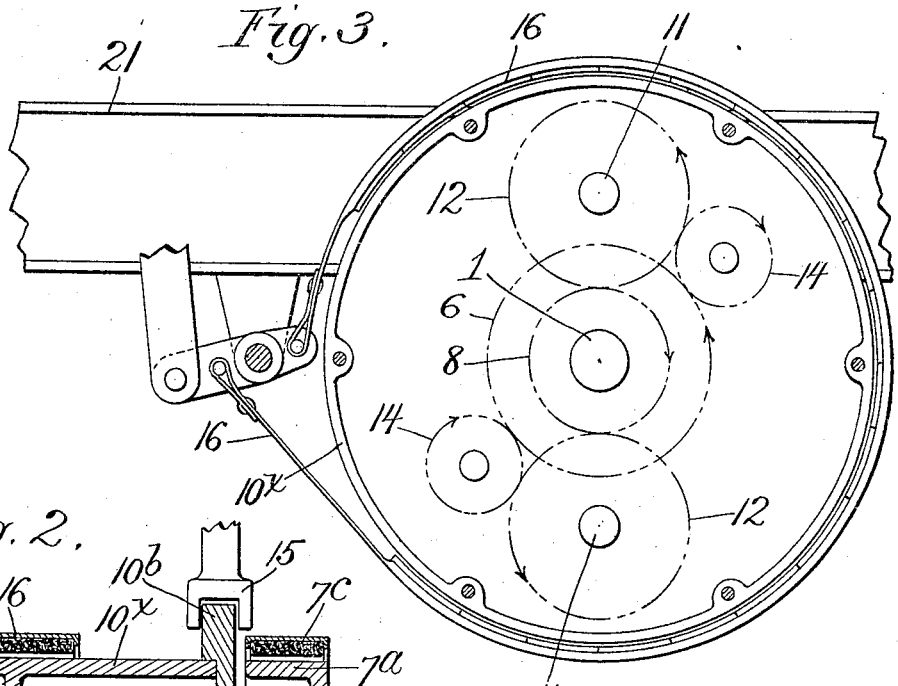
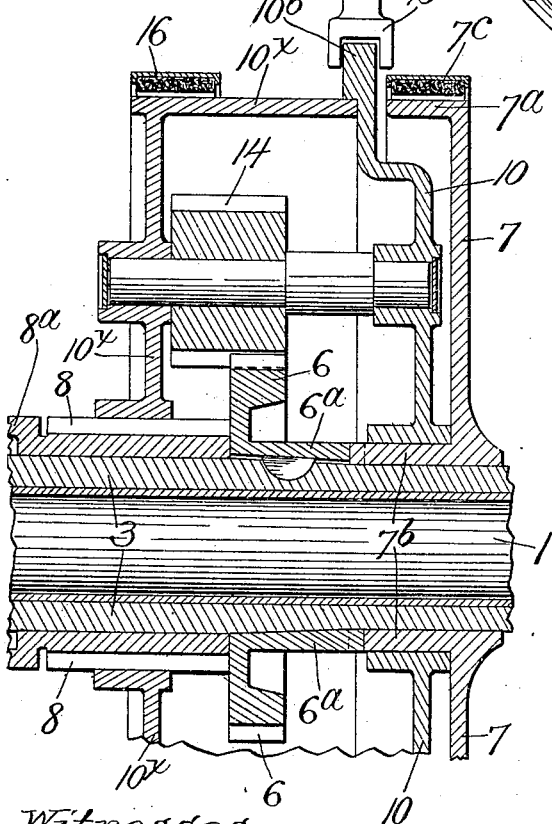
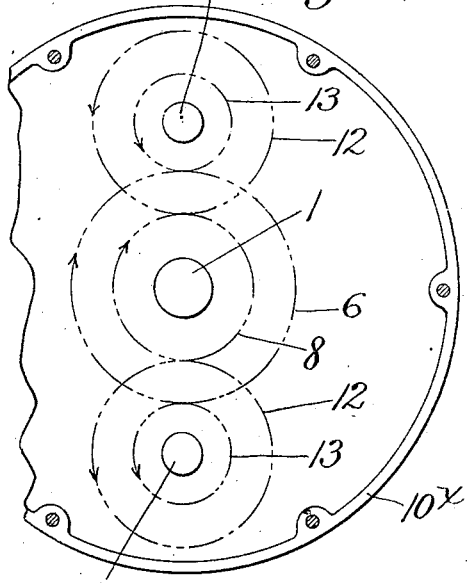

ROBERT SYMMONDS, JR., OF KENOSHA, WISCONSIN, ASSIGNOR TO THOMAS B. JEFFERY, OF KENOSHA, WISCONSIN.

POWER-TRANSMITTING MECHANISM FOR MOTOR-VEHICLES.

No. 809,338.      Specification of Letters Patent.      Patented Jan. 9, 1906.

Application filed April 7, 1905. Serial No. 254,379.

*To all whom it may concern:*

Be it known that I, ROBERT SYMMONDS, Jr., a citizen of the United States, residing at Kenosha, in the county of Kenosha and State of Wisconsin, have invented new and useful Improvements in Power-Transmitting Mechanism for Motor-Vehicles, of which the following is a specification, reference being had to the accompanying drawings, forming a part thereof.

The purpose of this invention is to provide an improved mechanism for transmitting power from a motor to the driving axles or wheels of a vehicle.

It consists of the features of construction set out in the claims.

In the drawings, Figure 1 is a section axial with respect to the main power-shaft through the portion of the driving-train concerned in the invention, showing the adjustable parts adjusted in position for full speed forward. Fig. 2 is a detail section similar to Fig. 1 through a portion of the train showing the parts adjusted for slow speed backward. Fig. 3 is an elevation of the planetary gear-train, frame, or case with one plate removed, showing diagrammatically by the pitch-lines only the wheels of the train which are concerned in the reverse movement. Fig. 4 is a similar view omitting certain parts, showing diagrammatically the wheels concerned in the slow forward speed.

The main power-shaft 1 may be understood as deriving power from the motor in any manner. (Not shown.) Rigid with this power-shaft is a fly-wheel 2, hereinafter termed the "power-wheel."

3 is a power-transmitting sleeve mounted for rotation and sliding on the power-shaft and having at the end next to the power-wheel a disk 3ª, which terminates in a flange 3ᵇ, having suitable sheathing 3ᶜ and operating one element of a friction-clutch for engaging the power-wheel, such engagement being effected against the inner frusto-conical surface 2ᵇ of the rim 2ª of said power-wheel. A spring 4, stopped at its outer end by the parts constituting the bearing of the power-shaft, reacts at its inner end against a collar 3ᵈ on the sleeve 3 for holding the sleeve inward toward the power-wheel for making frictional engagement between the friction-flange 3ᵇ and the face 2ᵇ of the rim of said wheel. The sprocket-wheel 5 is the power-transmitting wheel for communicating power to the vehicle axle or wheels, said sprocket-wheel being fast on the sleeve 3. Fast on said sleeve 3, and thereby rigid with the power-transmitting wheel 5, is a gear-wheel 6, and between the sleeve-hub 6ª of said gear-wheel and the hub of the power-transmitting wheel 5 there is mounted on the sleeve 3 the brake-disk 7, to whose flange 7ª a brake-strap 7ᶜ is applied in any customary manner. This brake-disk is made rigid with the sleeve 3 by having its hub 7ᵇ interlocked with the sleeve-hub 6ª of the gear 6.

8 is a gear journaled about the sleeve 3 and rigid with the power-wheel, and thereby with the shaft, its rigid connection with the power-wheel being made by spider arms or spokes 8ᵇ, extended from the hub 8ª of said gear, the hub being extended from the gear-teeth inward toward the plane of the power-wheel, so that the spider arms or spokes extend out along the face of the disk 3ª and are deflected outward to pass by the clutch-flange 3ᵇ and reach the face of the rim 2ª, to which said spider arms and spokes are bolted, as seen in Fig. 1. A planetary-gear frame, comprising two parts 10 and 10ˣ, which are bolted together, as seen at 10ª, is mounted for rotation about the shaft, being journaled exterior to the sleeve 3 and the hubs of the gears 6 and 8, on whose hubs 6ª and 8ª, its two members 10 and 10ˣ, respectively, are journaled. On axles 11 11, mounted in said planetary-gear frame, there are journaled planetary gears (preferably two, at diametrically opposite positions) 12 12, each having rigid with it a smaller gear 13. The gear 12 meshes with the gear 8, and the latter gear is enough longer than said gear 12 to permit movement of the gear 12 longitudinally with respect to the shaft 1 for a distance at least twice the width of said gear 12 without passing out of mesh with said gear 8. The gear 13 is spaced from the gear 12 along the axle 11 such distance as to be in mesh with the gear 6 when the gear 12 is at the limit of its range of adjustment toward the power-wheel and to pass out of mesh with said gear 6 when the planetary-gear frame and gears thereon are moved away from the power-wheel a distance a little more than the width of the wheel 12.

In the planetary-gear frame there are journaled in addition to the above-mentioned wheels the reversing-gears 14 14, (see Fig. 3,) which are at all times in mesh with the gears 12 12, respectively. When the planetary frame is adjusted for meshing the gears 13 with the gear 6, the gears 14 do not reach said gear 6, and the frame may be adjusted away from the power-wheel, carrying the gears 13 wholly out of mesh with the gear 6 without bringing said gears 14 into mesh with the gear 6. At this medial position it will be noticed the gear 6 is not engaged at all with the train. The gears 14 are about double the length of the gears 12, and the planetary-gear frame may be adjusted far enough to bring the gears 14 fully into mesh with the gear 6. The member 10 of the planetary-gear frame is provided with a projecting flange 10$^b$, which may be engaged by any suitable means, as the fork 15, for moving the gear-frame longitudinally with respect to the shaft 1, to which the gear connects, as above described. A brake-band 16 encompasses the planetary-gear frame and is designed to be operated in a familiar manner (seen in Fig. 3) for holding the frame non-rotating or releasing it to permit it to rotate. When the clutch-flange 3$^b$ is engaged with the power-wheel for giving the power-transmitting wheel 5 full speed forward, the planetary-gear frame will be adjusted to medial position, so that the gear 6 will not be engaged with the train, and the frame may either be held by the band 6, in which case the planetary-gear train will revolve idly, or it may be released from the band 16, so as to revolve bodily with its contents more or less with the sleeve 3 and the power-shaft 1. For slow speed, forward or reverse motion, the operator will move the sleeve 3 to disengage the clutch-flange 3$^b$ from the power-wheel and tighten the band 16 to hold the planetary-gear frame at rest, and the planetary-gear frame being then adjusted to the left, as seen in Fig. 1, will cause the power-transmitting wheel to derive slow movement forward by means of the train comprising the gear 8 and planetary gears 12 and 13, the latter meshing with the gear 6. By adjusting the planetary-gear frame to the right the power-transmitting wheel will derive still slower movement in the reverse direction through the train comprising the gear 8 meshing with the gears 12, the latter meshing with the reverse-gears 14, which in turn mesh with the gear 6.

Any suitable mechanism may be employed for operating the fork 15 to shift the planetary-gear frame and to operate the shipping-lever 19 for taking the clutch-flange 3$^b$ out of engagement with the power-wheel. Part of such mechanism is shown in Fig. 1, the lever 19 having a transverse guide-stem 20, which has guide-bearing in the frame-bar 21, and abutment-rolls 22 and 23, between which a wedge 24 is adapted to be thrust for giving lateral movement to the shipping-lever 19.

I claim—

1. A power-transmitting mechanism comprising a power-shaft, a power-transmitting wheel loose on such shaft; a driving-gear rigid with the power-shaft; a driven gear rigid with the power-transmitting wheel; a gear-frame and a gear-train therein having an initial wheel meshing with said driving-gear and comprising two gears in different transverse planes connected in the train for opposite rotation and each adapted for meshing with the driven gear, said gear-frame being movable along the power-shaft and means for moving it back and forth.

2. A power-transmitting mechanism comprising a power-shaft, a power-transmitting wheel loose on the shaft; a driving-gear rigid with the power-shaft; a driven gear rigid with the power-transmitting wheel; a gear-frame mounted for rotation about the power-shaft; a gear-train on such frame having an initial wheel meshing with the driving-gear and comprising two gears in different transverse planes connected in the train for opposite rotation, each adapted for meshing with the driven gear; means for holding the gear-frame against rotation and means for moving it back and forth along the power-shaft.

3. A power-transmitting mechanism comprising a power-shaft, a power-wheel rigid therewith; a power-transmitting wheel loose on the power-shaft; a driving-gear rigid with the power-wheel; a driven gear rigid with the power-transmitting wheel; a planetary-gear frame mounted for rotation about the power-shaft; a gear-train on such frame having an initial wheel meshing with the driving-gear and comprising two gears in different transverse planes connected in the train for opposite rotation, each adapted for meshing with the driven gear; means for disengageably engaging the driven gear with the power-wheel; means for holding the planetary-gear frame against rotation and means for moving said frame back and forth along the shaft.

4. A power-transmitting mechanism comprising a power-shaft, a power-transmitting wheel loose on the shaft; a driving-gear rigid with the power-shaft; a driven gear rigid with the power-transmitting wheel; a planetary-gear frame journaled for rotation about the power-shaft; a gear-train on such frame comprising two gears rigid with each other situated for meshing with the driving-gear and with the driven gear respectively, said train comprising a third gear meshing with the first of said two gears in a different plane transverse to the power-shaft from the second of said gears, said planetary-gear frame being movable back and forth along the power-shaft.

In testimony whereof I have hereunto set my hand this 22d day of March, A. D. 1905, at Kenosha, Wisconsin.

ROBERT SYMMONDS, JR.

In presence of—
T. L. KNAPP,
H. DEVINE.